Jan. 7, 1969   R. E. O'BRIEN   3,420,004
FORMED PLASTIC ARTICLE DE-SLIVER UNIT
Filed May 28, 1965

INVENTOR.
ROBERT E. O'BRIEN
BY
ATTORNEYS

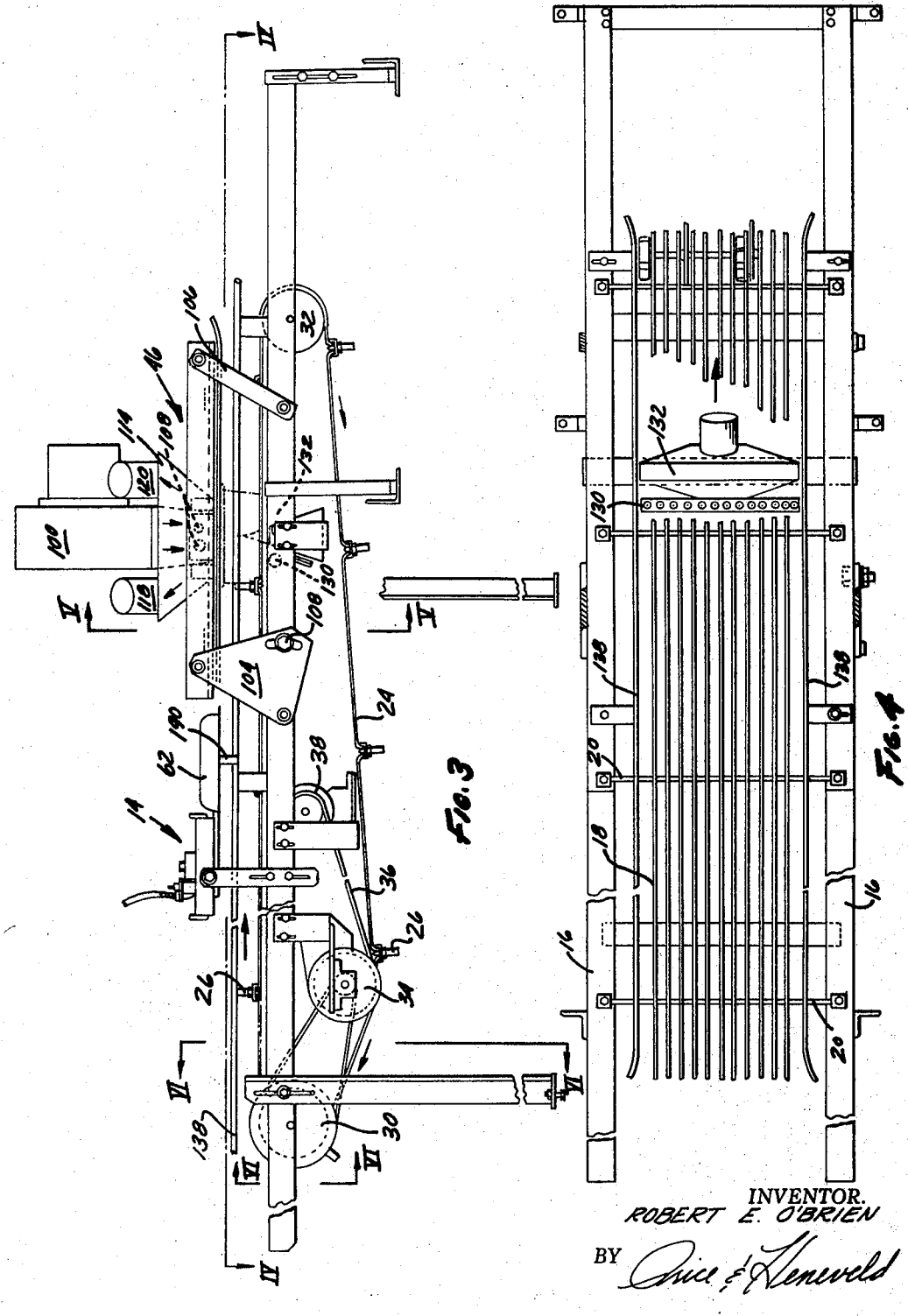

Jan. 7, 1969  R. E. O'BRIEN  3,420,004
FORMED PLASTIC ARTICLE DE-SLIVER UNIT
Filed May 28, 1965

INVENTOR.
ROBERT E. O'BRIEN
BY
ATTORNEYS

INVENTOR.
ROBERT E. O'BRIEN
BY
ATTORNEYS

INVENTOR.
ROBERT E. O'BRIEN

BY

ATTORNEYS

United States Patent Office 3,420,004
Patented Jan. 7, 1969

3,420,004
FORMED PLASTIC ARTICLE DE-SLIVER UNIT
Robert E. O'Brien, Grand Rapids, Mich., assignor to Kirkhof Manufacturing Corporation, Grand Rapids, Mich., a corporation of Michigan
Filed May 28, 1965, Ser. No. 459,782
U.S. Cl. 51—5      8 Claims
Int. Cl. B24b 29/00

ABSTRACT OF THE DISCLOSURE

Apparatus for de-slivering thin walled plastic articles formed by force from a plastic film and peripherally severed from the film, having dynamic article edge abrading means such as brushes that abrades or rubs the article edges, preferably at angles thereto to detach the slivers, combined with electrostatic sliver charging means and flowing gas sliver removal means that buoys the slivers and sucks them away from the articles.

---

This invention relates to apparatus for treating plastic articles formed from sheet material by forming techniques such as pressure differential forming, and more particularly relates to a method and apparatus for de-slivering plastic articles, particularly plastic container trays.

The art of forming tremendous numbers of plastic articles from a continuous thermoplastic sheet by pressure differential and/or matching die techniques has been developed to significant commercial usage. The formed articles are severed from the web matrix by a cutting die or by breaking them along peripheral creases. Presses like that in United States Patent No. 3,166,790, for example, can form thousands of container type articles in a relatively short time. These container trays are useful for many types of materials and articles, including food stuffs, such as cookies, candy, etc. Such containers are aesthetically attractive as well as inexpensive and moisture proof.

With use of these plastic trays however, it was discovered that there is a disadvantage which becomes very significant when the containers are used for food stuffs. This disadvantage was found to be the presence of tiny plastic "slivers" on the containers. Some of these slivers were found in a loose condition in the carton and others were found clinging to the peripheral edge of the container. Investigation has shown that these tiny plastic slivers, which are normally transparent and very difficult to see, are created with die cutting or creasing of the article periphery to separate it from the web matrix from which it is formed. A good share of these slivers are not initially completely physically separated from the peripheral article edge, but become easily disengaged from the edge by snagging on adjacent surfaces of articles being inserted, of machinery handling the trays subsequent to their forming and other connecting surfaces. The slivers often fall into the tray-type articles onto or beneath the food stuffs being or to be inserted. Some of the slivers initially fall along the outside of the tray and cling to the plastic material. This clinging retention is very pronounced, whether the slivers are inside or outside the plastic formed trays, since the plastic material by its nature tends to build up a considerable static electricity charge. These tiny slivers constitute a real nuisance by remaining in the containers, and also by snagging and peeling off during handling of the trays.

It is an object of this invention to provide a de-slivering apparatus for plastic articles formed and severed from a continuous thermoplastic web. The articles may be formed by pressure differential techniques, matching die techniques, pressure differential supplemented by plug assist, or related methods of forming.

Another object of this invention is to provide an apparatus for continuously detaching plastic slivers from peripheral severed edges of plastic articles formed and severed from a thermoplastic web, and removing the detached slivers completely out of the articles.

Another object of this invention is to provide a method of forming and de-slivering plastic articles, particularly tray-type containers, which articles are free of tiny, transparent slivers.

Another object of this invention is to provide a method of obtaining from a thermoplastic web, containers that are highly useful for food stuffs and the like and which are not contaminated with tiny plastic slivers.

These and several other objects of this invention will become apparent upon studying the following specification in conjunction with the drawings in which:

FIG. 3 is a side elevational view of the apparatus in FIG. 1;

FIG. 4 is a sectional view of the apparatus in FIG. 3 taken on plane IV—IV, but with the tray advancing structure not shown;

*First form of assembly*

Figure 1:
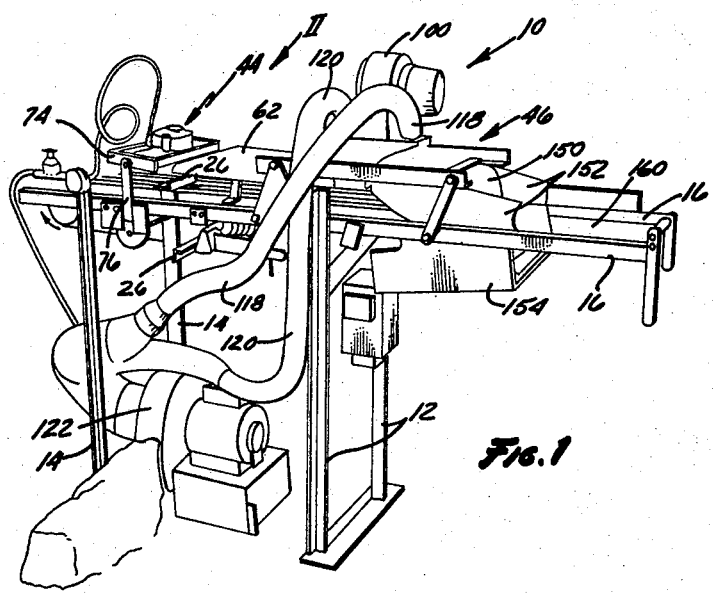
FIG. 1 is a perspective view of one form of the apparatus.

Referring now specifically to the drawings, particularly FIG. 1, the complete de-slivering assembly 10 is supported on a suitable framework which includes a pair of upright supports 12 and 14, each having feet, and upwardly standing spaced legs. These support a horizontal platform 16 composed of two spaced parallel elements that extend longitudinally of the mechanism, and suporting a plurality of elongated spaced parallel bars 18 (FIG. 4) therebetween on transverse rods 20 to form an article support surface. This plurality of elongated bars 18 forms open horizontal support for trays advanced through the equipment. The perforate construction of the spaced bars enables air to be passed for action on the trays in a manner to be described hereinafter.

Formed plastic articles are advanced along these bars by a recirculating tray advancing means. This includes endless belt link chain, or rope type means, here shown to be a pair of endless belt elements 24 mounting upstanding traverse pusher plates 26 which move along and over the surface of rods 18. These belts recirculate around pairs 30 and 32 of rotary wheels, here shown as idler pulleys, at the front and rear ends, respectively, of the apparatus. The belts are returned beneath the platform, around the rotary drive pulley 34 driven by power belt 36 from a motor and pulley combination 38 mounted to the framework. If a chain or two is employed, the rotary wheel would of course be sprockets.

Thus, trays are fed into the structure on the left end of the apparatus as viewed in FIGS. 1, 3, 4, and 7 (or the right end as viewed in FIG. 2) to be advanced to the discharge end. The trays pass through a sliver detacher subassembly 44 and a sliver remover subassembly 46.

Nature of trays

Figure 8:
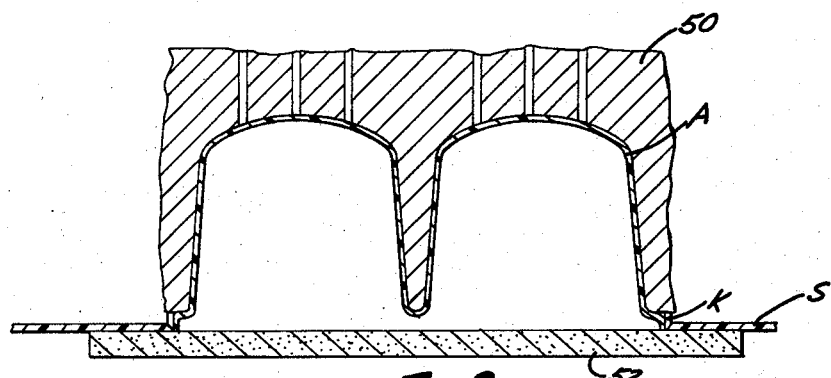
FIG. 8 is an enlarged fragmentary, sectional view of a tray type article being formed and severed from its sheet.
Figure 9:
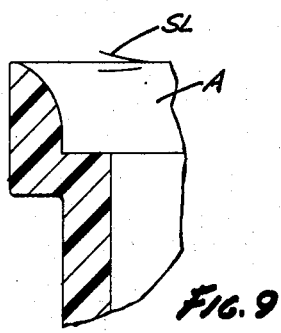
FIG. 9 is a fragmentary, enlarged view of a small edge portion of the tray in FIG. 8.

Referring to FIGS. 8 and 9, when a container type tray A is formed by pressure differential or matched die forming techniques as in a die 50 against a hot plate 52, from a thermoplastic web or sheet. S, the sheet is first deformed into the desired configuration. In the die mechanism shown, after the die lowers to cause the knife edge K to seal it and the article is formed, the knife is lowered further to penetrate the sheet, to crease or cut it.

Figure 5:
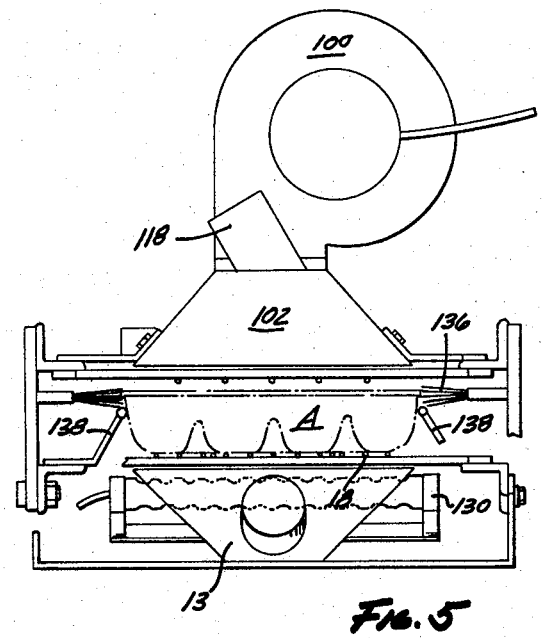
FIG. 5 is a sectional view of the apparatus in FIG. 3 taken on plane V—V.
Figure 7:
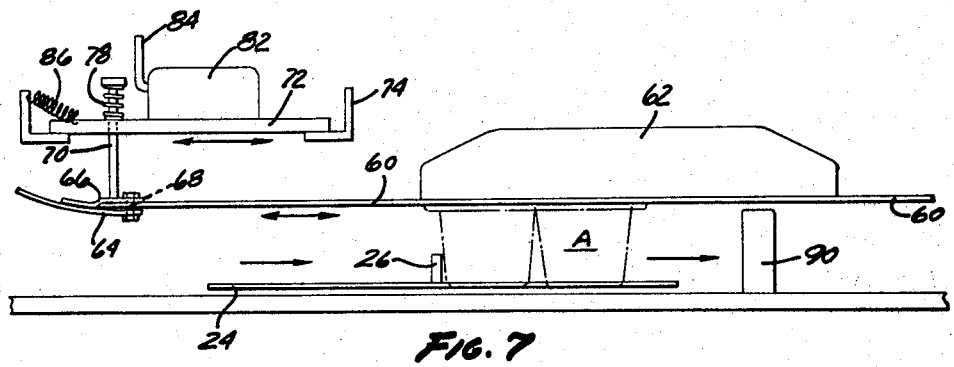
FIG. 7 is a fragmentary, enlarged, side elevational view of the apparatus in FIG. 2, taken from the direction indicated by the arrow VII.

The tray is then broken out of sheet S to comprise a separate article similar to that shown in phantom in FIG. 3, FIG. 5, and FIG. 7. Instead of having separation means on the forming die, a post forming trim die may be used. This is particularly true for matched die forming. Upon severing of the tray from the sheet, tiny slivers illustrated at SL on article A in FIG. 9, form along the peripheral edge at which the article is severed. A good share of these slivers are attached to the edge, but some fall from the edge and cling by electrostatic attraction to the inside or outside wall of the articles.

First form of sliver detacher

Figure 2:
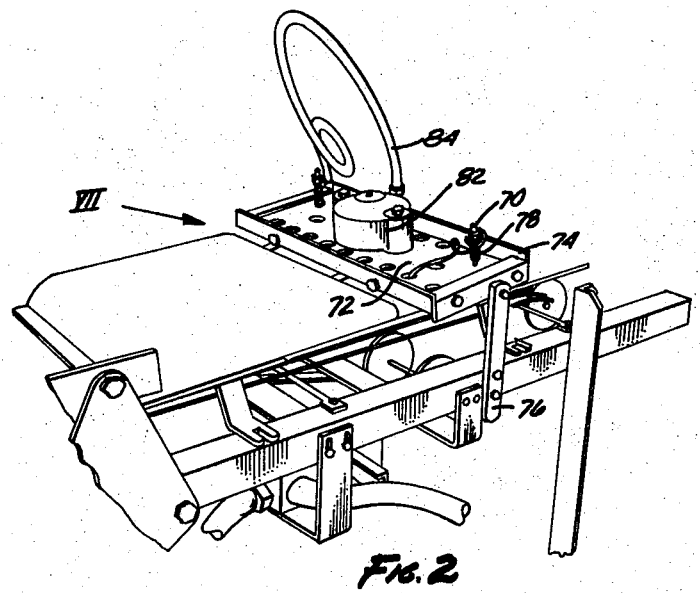
FIG. 2 is an enlarged perspective fragmentary view of the one end of the apparatus in FIG. 1 taken from the direction indicated by the arrow II.

The first form of the novel apparatus detaches the attached slivers with an abrasive action using subassembly 44 shown in FIGS. 1, 2, and 7. This sliver detaching means includes an abrading sheet 60. It preferably has tiny carbide tips set on end over its surface, to form a vigorous abrader. This flexible sheet has adhered on its upper surface a foam plastic counterweight 62 such as rigidified polyurethane foam. This gives the sheet several ounces of pressure against the upturned peripheral edge of a plastic article being treated. The particular amount of weight applied can be varied within a few ounces in accordance with the thickness, edge size and configuration, and type of plastic of the article being acted upon.

The sheet 60 is of substantially rectangular shape. Its one end is secured between a pair of metal plates 64 and 66 by a plurality of bolts 68. Of these metal plates, upper plate 66 is welded or otherwise suitably secured to the lower end of a pair of transversely spaced studs 70 which project upwardly from the plate through an orificed vibrator plate 72 of plastic or metal. This vibrator plate is mounted in a framework 74 which supports it above the frame by a pair of side arms 76 (FIG. 1). Coil springs 78 are on studs 70 between the upper enlarged heads thereof and plate 72 to provide more effective vibratory action.

Plate 72 is vibrated by a conventional ball type, air operated eccentric vibrator 82 operated by air supplied through a pressure hose 84. For maximum vibratory action, it has been found preferable to provide a coil tension spring 86 between the back side of the frame and plate 72. Since plate 72 has a loose fit in both horizontal dimensions in frame 74, vibration of element 82 causes it to oscillate in both directions to move the flexible abrading sheet 60 in a vibratory oscillatory pattern.

Thus, when the advancing means, particularly cables 24 with their pushers 26, move a tray article A beneath the abrading sheet, the article lifts the sheet off resting elements 90 on each side of the device to cause abrasion of the edge. The extent of abrasion is controlled within a maximum amount by the position of the top surface of rests 90 which are made of hardened material to resist abrasion by the lightly weighted abrading paper. The articles are passed continuously through this abrader and then to the sliver removal apparatus. It will be realized that the abrasion by this form of the device not only removes the slivers, but also portion of the edge itself.

Sliver remover

The trays are advanced from subassembly 44 to the sliver removal subassembly 46. This sliver removal subassembly includes a top unit above the tray support surface and a bottom unit below the tray support surface. More specifically, the top unit has an air blower 100 positioned with its outlet directed downwardly into a cowl 102. The cowl is mounted to the framework (FIG. 5) and positioned immediately above the articles A passing therethrough. The height of this unit can be varied to cause its lower surface to be immediately adjacent the abraded edge of the article, by adjusting the parallelogram linkages 104 and 106 (FIG. 3) with loosening of bolts 103.

Positioned inside cowl 102, immediately adjacent the object, is an electrostatic neutralizer which comprises a pair of transverse tubes 108 (FIG. 3) which ionize the air being blown into the trays.

The static electricity neutralizer units 130 or 108 comprise elongated hollow cylindrical bars. They have a charged outside surface. They also have ports on both sides of the article oriented toward the article and through which the air passes. Needle type electrodes are located in the ports (FIG. 4), and have the opposite charge to that on the outside of the housing. These units may be purchased for example from the Simco Company, Inc., Lansdale, Pennsylvania.

The ionized air neutralizes the static charge on the slivers and any abraded particles in the trays. It will be realized that these plastic materials pick up static electricity charges very readily. This is accentuated by the abrasion action which has just occurred on the article.

The ionized air is blown down into the trays in the center of the tray as it passes. Astraddle the blower front and back is a pair of vacuum or suction units 112 and 114 which draw the air back out of the unit through ducts or hoses 118 and 120 (FIG. 1) attached to a vacuum fan 122 like that shown in FIG. 1. Thus, the ionized injected air is forced down into the tray to neutralize the slivers and other abraded particles and simultaneously bouy them up toward the outside of the container, so that the suction units can draw out the air and particles to clean out the trays.

Simultaneously, the bottom of the tray is treated by having a static neutralizing unit 130 (FIG. 3) immediately adjacent the bottom of the tray, and a suction unit 132 just downstream thereof, to draw off the neutralized slivers which fall to the outside of the tray.

It has also been found preferable to have a pair of tray contacting brushes 136 (FIG. 5) on opposite sides of the tray, to contact the edges of the tray as it moves past in its guided path, retained by guide elements 138 (FIGS. 5 and 4). These guide elements straddle the container support surface and are elevated slightly thereabove to form a sliding contact with the sides of the trays or containers as they are pushed along.

Downstream of the removal unit is a dusting cloth 150 which drapes down over the path of the articles, and a pair of side dusting cloths 152 to remove any final material left on the trays. Beneath this is a sliver receiving tray 154 to catch any remaining slivers which the vacuum units have not pulled off and which are knocked off the tray by the dust cloth. These cloths supplement brushes 136 (FIG. 5) in this function.

Consequently, it will be noted from this description that the mechanism is a continuously operating apparatus which can handle a great number of these trays at a time, to condition these for receiving food stuffs and the like without contaminating the materials with tiny almost invisible transparent plastic slivers. Trays are fed onto the one end, as from an automatic de-stacker, or manually. They pass beneath the abrader which lifts up off its guide rests 90 temporarily so that, in its vibratory action, it abrades the peripheral edge of the articles to detach the slivers. The trays move continuously to the sliver removal area where the slivers are electrostatically neutralized using ionized air blow down into the trays, or on the bottom of the tray, followed by vacuum removal of the slivers. Subsequently the dust cloths remove any few retaining materials left on the trays. They then pass off the discharge end at 160 illustrated in FIG. 1 into a suitable container (not shown).

*Second form of assembly*

Figure 10:
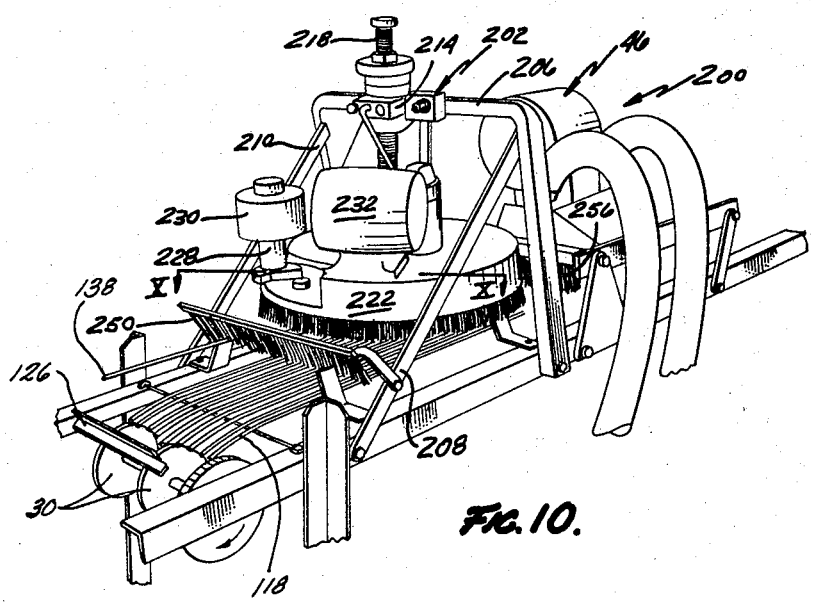
FIG. 10 is a perspective view of a second preferred form of the apparatus.
Figure 11:
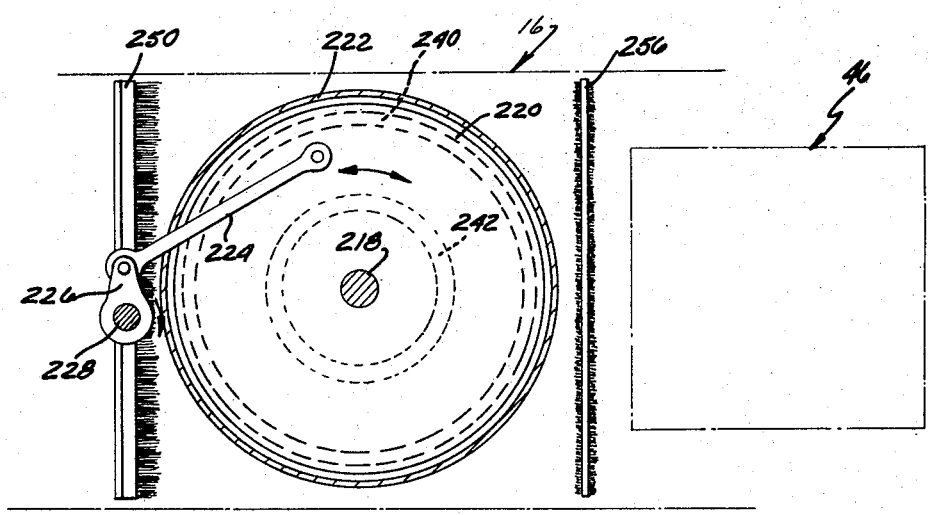
FIG. 11 is a sectional view of a portion of the apparatus in FIG. 9, taken on plane X—X.

Referring now specifically to FIGS. 10 and 11, the second and preferred form of the apparatus is there illustrated. Apparatus 200 includes a second form of sliver detachment subassembly 202, but the same sliver removal subassembly 46 as that previously shown and described with respect to the first form of the invention.

Figure 6:
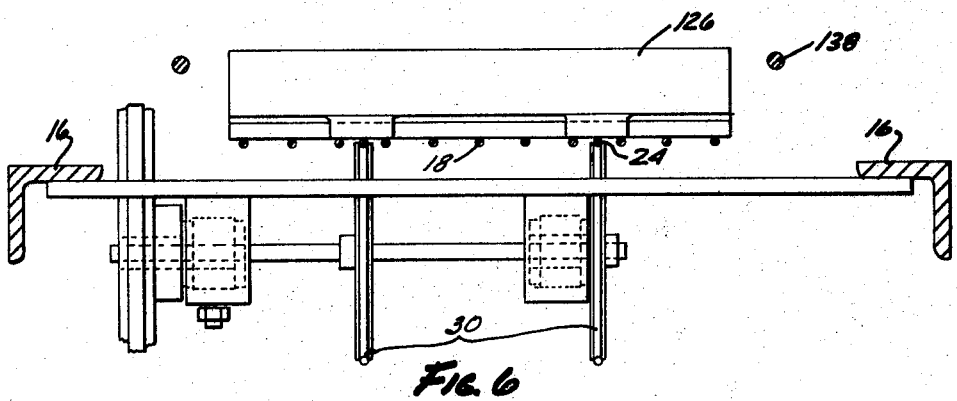
FIG. 6 is a sectional view of the apparatus in FIG. 3 taken on plane VI—VI.

The supporting frame work, and the container support, driving, and guide apparatus are the same as those illustrated previously. FIGS. 4, 5, and 6 represent the second as well as the first form of the assembly and therefore are not repeated.

The modification subassembly 202 of the sliver detachment means was devised after it was determined that the first abrading form of the detaching apparatus did not work too well on some containers, particularly very thin walled containers. The abrasive action on the upper edge by the sheet was too vigorous for flexible materials only a couple of mils in thickness. The edges tend to flex back and forth so that in some instances the edges still retained some plastic slivers.

The second form of the apparatus has a different type abrading action, and achieves an improved multiple direction rubbing action at several angles to the peripheral edges, with bristle elements that sweepingly rub on the side surfaces adjacent the edges.

Subassembly 202 is supported on the framework by an upstanding, inverted, generally U-shaped bracket 206, and a pair of diagonal brace bars 208 and 210 astraddle the assembly. Suspended from this bracket, and specifically from a threaded vertical collar 214 mounted thereto, is a brush assembly. The brush assembly is vertically adjustable as by being attached to the lower end of a vertically adjustable threaded vertical shaft 218 which extends through collar 214. Attached on its lower end is a circular horizontal disk 220 inside a housing 222 which has an open bottom. This disk is mounted to be oscillatory on shaft 218. It is driven in an arcuate oscillatory pattern about shaft 218 by a rod 224 attached on one of its ends to the disk, eccentric of its center, and at its other end to a rotatable crank 226. Crank 226 is mounted to the lower end of the output shaft 228 of a gear box 230 driven by an electrical motor 232. This motor is mounted on the upper surface of housing 222.

Secured to and depending from the underside of disk 220 is brush means. This is preferably in the form of two different diameters, concentric annular brushes 240 and 242 of about the same bristle length. These brushes have quite rigid bristles, preferably of Tampico or polypropylene, or alternatively of fine gauge wire.

Adjacent the lead-in portion of this brush means is a transverse brush 250 which is diagonally downwardly oriented toward the annular brushes. This brush holds the containers down and prevents them from bending back and buckling as they are fed into the oscillatory apparatus.

Another transverse brush 256 downstream of the oscillatory brush is optional, serving to whisk lingering slivers off the plastic articles.

This oscillatory, brush-type sliver detachment apparatus has been found to operate very effectively. It has a unique action because of its circular nature and arcuate oscillations, particularly when employed on rectangularly shaped trays. More specifically, since the trays are usually generally rectangular in configuration, and since the brushes are annular, as the brushes oscillate over the advancing upturned edge of the articles, the vertical bristles contact these edges at constantly varying transverse angles. When the article is initially introduced, the edge of the brush first contacting it tends to be generally coplanar with the front article edge, and generally normal to the side edges. However, this angle constantly changes as the tray moves beneath the brush, to therefore have optimum action on all portions of the edges and on slivers clinging to these edges. Also, since the disk moves in a rapidly reversing oscillatory arcuate pattern, each edge is abraded in both directions at any particular angle, both when it enters the unit and when it leaves. The oscillatory pattern has another important result, that of maintaining the trays generally aligned along the support surface, rather than cocking them in one direction. If the brush were only rotated in one direction, the trays would tend to be cocked in one direction on the support surface. By repeatedly shifting the bristles back and forth in opposite directions, however, the trays remain properly oriented.

The bristles are elevated to a position to have their lower ends slightly vertically overlap the upper article edges. The rigidity of the bristles achieves a type of abrading action with manifold contact of the tiny bristles along the sides of the edges as well as the upper surface of the edge.

After the trays move beneath the sliver detachment subassembly, they move into the ionizing sliver removal subassembly, where the sliver removal is according to that described with respect to the first form of the invention.

When articles of different heights are abraded, threaded shaft 218 is adjusted appropriately to position the bristles properly with respect to the upper edge of the container. Also, as previously described, the vertical height of the sliver removal apparatus can be adjusted on this form of the invention also, by shifting the parallelogram linkage. If desired, both subassemblies may be mounted to be vertically adjusted together. Obviously, such variations as this could be employed without departing from the concept.

It has been found with operation of this device upon containers that it does effectively solve the sliver problem which previously existed. It is conceivable that certain other minor details may be modified within the concept presented. Thus, the invention is intended to be limited only by the scope of the appended claims and the reasonably equivalent structures and methods to those defined therein.

I claim:

1. Apparatus for treating thin walled plastic articles formed from a film and severed from the film around their peripheral edge by a cutting edge, comprising, in combination: dynamic edge, article abrading sliver detaching means to engage the thin wall edges and detach slivers from the articles; electro-static sliver charging means; flowing gas sliver withdrawal means to remove the charged slivers from the articles; and article handling means operatively associated with said sliver detaching means, sliver charging means, and sliver withdrawal means to associate articles with these means in the order recited.

2. De-slivering apparatus for thin walled plastic articles formed from a thermoplastic film and severed from the film around their peripheral edge by a cutting edge, comprising, in combination: article support means; dynamic, article edge sliver detaching means operatively adjacent to and spaced from said support means; gas blower means oriented toward said support means to buoy up the slivers; electro-static gas charging means operatively associated with said gas blower means to charge gases blown toward said support means; gas and sliver withdrawing suction means to withdrawn the buoyed slivers and buoying gas; and article advancing means operatively associated with all of said previously means to allow detachment of edge slivers, electro-static charging and suspension of said slivers with blown gas, and subsequent withdrawal of said slivers with the gas.

3. De-slivering apparatus for plastic trays formed and severed from a thermoplastic web, comprising: dynamic edge contacting means positioned and driven to rub against the container edges to detach slivers therefrom; ionized gas flow sliver suspension and removal means adjacent said edge contacting means; and means to bring containers into operative relation first to said edge contacting means and then said sliver suspension and removal means.

4. De-slivering apparatus for plastic trays formed and severed from a thermoplastic web, comprising: edge contracting means to rub against the container edges to detach slivers therefrom; said edge contacting means comprising bristles, and means to dynamically oscillate said bristles across the container edges at angles thereto; ionized gas flow sliver suspension and removal means adjacent said edge contacting means; and means to bring containers into operative relation just to said edge contacting means and then said sliver suspension and removal means.

5. De-slivering aparatus for plastic trays formed and severed from a thermoplastic web, comprising: edge contacting means to rub against the container edges to detach slivers therefrom; said edge contacting means comprising a large number of stiff bristles extending from a support, and means to dynamically oscillate said support and bristles in an arcuate path ionized gas flow sliver suspension and removal means adjacent said edge contacting means; and means to bring containers into operative relation just to said edge contacting means and then said sliver suspension and removal means.

6. Apparatus for de-slivering plastic articles formed from a film and severed from the film around their peripheral edge by cutting edge, comprising, in combination: article conveying means; dynamic edge abrading means adjacent said conveying means and positioned to dynamically abrade the passing edges of the plastic articles; powered drive means for said abrading means to cause a rubbing abrasion action on said deges to detach plastic slivers therefrom; electro-static sliver charging means along said conveying means downstream of said edge abrading means to apply a charge to detached slivers on passing articles; and flowing gas, sliver removal means along said conveyor, downstream of said charging means, to remove the slivers from said articles by conveying them therefrom on a gas stream.

7. A method of treating plastic articles formed from a film by pressure differential techniques, and severed from the film around their peripheral edges by a cutting edge, so as to have plastic edge slivers, comprising the steps of: rubbingly abrading the article edges at angles thereto for detaching the slivers from the edges of the articles; electro-statically charging the detached slivers and the articles with flowing ionized gas; and buoyantly separating the charged slivers from the articles with said gas.

8. A method of treating plastic articles formed from a film by pressure differential techniques, and severed from the film around their peripheral edges by a cutting edge, comprising the steps of: lightly abrading the article peripheral edges at angles thereto with dynamic bristles to detach plastic slivers therefrom; blowing electro-statically charged gases across said edges to apply a charge to said detached slivers and withdrawing said gases and slivers from said articles.

References Cited

UNITED STATES PATENTS

| | | | |
|---|---|---|---|
| 2,231,921 | 2/1941 | Kitlar et al. | 51—5 |
| 2,913,853 | 11/1959 | Solem | 51—5 |
| 3,074,210 | 1/1963 | Eschenburg et al. | 51—273 X |
| 1,182,050 | 5/1916 | Stern | 15—308 |
| 1,806,237 | 5/1931 | Chase et al. | 68—17 |
| 1,980,602 | 11/1934 | Toniatti | 15—77 |
| 2,090,777 | 8/1937 | Baker et al. | 15—308 |
| 2,300,923 | 11/1942 | Hornor | 274—47 |
| 2,531,009 | 11/1950 | Stuart et al. | 51—308 X |
| 2,595,226 | 5/1952 | Cookson | 15—1.5 |
| 2,849,820 | 9/1958 | Reschke | 51—58 X |
| 2,979,747 | 4/1961 | Brauer | 15—21 |

LESTER M. SWINGLE, *Primary Examiner.*

U.S. Cl. X.R.

15—1.5, 21; 51—58, 273, 323; 264—161